United States Patent [19]

Gust et al.

[11] Patent Number: 5,474,730
[45] Date of Patent: Dec. 12, 1995

[54] PRODUCTION OF HIGHLY BIREFRINGENT FILM

[75] Inventors: Stephen J. Gust; Gregory W. Farell; Marshall D. Ledbetter, all of Greenville, S.C.

[73] Assignee: Hoechst Celanese Corporation, Somerville, N.J.

[21] Appl. No.: 74,242

[22] Filed: Jun. 9, 1993

[51] Int. Cl.$^6$ .................................................. D01D 5/12
[52] U.S. Cl. .................................. 264/210.5; 528/308.1; 528/308.2; 528/308.3; 528/481; 528/502 B; 528/503; 264/210.7; 264/211.12; 428/480
[58] Field of Search ............................. 528/308.1, 308.2, 528/308.3, 481, 502, 503; 264/210.5, 210.7, 211.12; 428/480

[56] References Cited

U.S. PATENT DOCUMENTS

| | | | |
|---|---|---|---|
| 4,042,569 | 8/1977 | Bell et al. | |
| 4,072,779 | 2/1978 | Knox et al. | 428/220 |
| 4,497,865 | 2/1985 | Minami et al. | 428/336 |
| 4,898,786 | 2/1990 | Swofford | 428/480 |

*Primary Examiner*—Samuel A. Acquah
*Attorney, Agent, or Firm*—G. N. Clements

[57] ABSTRACT

A thin, biaxially oriented polyester film which is asymetrically oriented by stretching 1–2 times in the machine direction and about 3–5 times in the transverse direction in the plane of the film is disclosed. The film has a birefringence of at least 0.085, an optical retardation of at least 9000 nanometers and a shrinkage of less than 2% in any direction at 150° C. The film produced is substantially free of color fringes when viewed in partially polarized light. There are also disclosed two processes for the production of said film.

24 Claims, No Drawings

PRODUCTION OF HIGHLY BIREFRINGENT FILM

BACKGROUND OF THE INVENTION

The present invention relates to a thin, biaxially oriented polyester film which is asymmetrically oriented by stretching 1.0–2.0 times in the machine direction in the plane of the film and about 3.0 to 5.0 times in the transverse direction in the plane of the film, said film having a birefringence of at least 0.085, an optical retardation of at least 9000 nanometers, a shrinkage of less than 2% in any direction at 150° C., which is substantially free of color fringes upon viewing in partially polarized light.

This invention also relates to two processes for the production of said biaxially oriented film.

The film of the invention may be bonded to materials, such as polyvinyl butyral, to form a two-ply or three-ply laminated structure, which further may be bonded to a glass layer or layers of a glazing structure to provide the desired optical and mechanical characteristics. The film of the invention can also be primed with adhesion promoters or other surface modifiers at any suitable stage during manufacture of the film, i.e. before or during the stretching operation, or it may also be applied to the finished film. Polyester films such as disclosed in U.S. Pat. No. 4,898,786 are contemplated.

The use of polymeric films in glazing applications is well-known. Oriented polyester film, particularly biaxially oriented film composed of polyethylene terephthalate (PET) has been widely used as a packaging material or as a base for microfilm, reprographic films, proofing films and the like. It has good optical clarity and toughness which renders it extremely suitable for such applications.

Polyester films can also be used as transparent and translucent layers applied to solid substrates and particularly to transparent substrates. Another more recent application for polyester film involves its use as an antilacerative layer in the construction of automotive glazing products such as windshields, rear windows, sun roof panels and the like, and in architectural safety glass. One of the simpler automotive glazing products may comprise a flexible interlayer of polyvinyl butyral sandwiched between glass on one side and a high modulus film, such as polyester film, on the opposite side.

The introduction of laminated safety glass for automotive glazing structures substantially reduced the hazard from flying glass shards. Such structures consist of two layers of glass bonded to a central layer of a tough, stretchable material such as plasticized polyvinyl butyral. These structures are designed to have the strength to allow bending but not penetration by the head of an occupant upon impact in a collision. Lacerations may occur if the head slides over the fragmented surface of the inner glass layer after impact; therefore, a layer of this tough, stretchable material used as the inner layer can prevent this source of injury.

One of the major problems in laminated safety glass is the "rainbow effect". If the material of any component of the glazing structure in the viewing system is slightly anisotropic to partially polarized light, color distortions are possible. These distortions are known as color fringes or the "rainbow effect". The requirement of freedom from color fringes when viewed in partially polarized daylight is a critical one. Additionally, an "elephant skin" effect is possible when there is excessive shrinkage of the film during the lamination process.

The preferred film of this invention has a higher birefringence then similar films known; it is this property that helps solve the problems of the "rainbow effect".

Although the use of polymeric films in glazing applications is known, the problem of manufacturing films possessing the properties of optical clarity, thermal stability, formability and the like, has not been successfully addressed.

Canadian Patent No. 596,193 to Gore et al., discloses one attempt at addressing these problems. This patent is directed to a safety glass laminate having a number of layers, one of which is a sheet of biaxially oriented polyethylene terephthalate. While the film disclosed therein possesses a number of the desired properties sought in windshield use applications, it lacks other properties, such as frangibility and freedom from color fringes or "rainbow" effects as well as "elephant skin" effects.

U.S. Pat. No. 4,072,779 to Knox et al. discloses a polyethylene terephthalate film which claims to have some of the desired properties however the film produced under the conditions of this patent but is extremely difficult to make as a heat stabilized film. The film produced is difficult to manufacture, process and handle because of the poor machine direction mechanical properties resulting from the conditions specified therein.

Means and materials for achieving this required optical property, in combination with other desired mechanical, thermal and optical properties, are the goals the present invention seeks and achieves.

DETAILED DESCRIPTION OF THE INVENTION

The essential discovery of this invention is a biaxially oriented polyester film for lamination to windshields of automobile. The film is frangible, thermally stable, optically clear, substantially free of color fringes when viewed in partially polarized light and substantially free of an "elephant skin" effect as caused by excessive shrinkage. Additionally, the invention relates to two novel processes for the production of said film.

In the present invention, the word "polyester" means a polyester made from terephthalic acid and ethylene glycol, which may contain a third component. As a dicarboxylic acid component, one or more of isophthalic acid, phthalic acid, 2,6-naphthalenedicarboxylic acid, terephthalic acid, adipic acid, sebacic acid, oxycarboxylic acid, etc. can be used. As glycols, one or more of ethylene glycol, propylene glycol, butanediol, 1,4-cyclohexanedimethanol, neopentyl glycol, etc. can be used. At any rate, the polyester used in the present invention should preferably be such that more than 80% of the repeating units comprise ethylene terephthalate.

To the above polyester, up to 30% of the total weight of polycarbonate, polyolefine, polyamide, etc. can be incorporated in the polyester insofar as the object of the present invention is not impaired. Additionally, incorporation of polyalkylene glycol or the like on the film surface is preferable for the purpose of enhancing adherence when the film is coated by vapor deposition.

The above-described polyester may contain an additive or additives such as stabilizer, colorant, antioxidative, defoamer, organic lubricant, etc. Usually, fine organic particles and/or inert inorganic particles are incorporated in order to provide the resulting film with slipperiness.

Such particles include external inert particles such as kaolin, clay, calcium carbonate, silicon oxide, calcium terephthalate, aluminum oxide, titanium oxide, calcium phosphate, lithium fluoride, carbon black, high-melting organic compounds which are insoluble in the polyester when it is melted and made into film, internal particles which are formed within the polymer from metal oxide catalysts used for synthesis of the cross-linked polymer and the polyester (such as alkali metal compounds and alkaline earth metal compounds).

As to the specific film of this invention, it has been found that a novel, polymeric film possesses the critical properties required in certain glazing uses. Such film preferably is a polyethylene terephthalate film that has a longitudinal or machine direction (MD) stretch of between 1.0 to 2.0 times its length and a tranverse direction stretch in a tenter frame at a ratio of about 3.0 to 5.0 times its width.

More particularly, the new film obtained has a birefringence of at least 0.085, a retardation of at least 9000 nanometers, preferably 10,000 nanometers and a shrinkage at 150° C. of 2% or less.

This application also relates to two novel processes for the production of the film of this invention.

The first process, referred to as the hot forward draw process, involves a polymeric film, preferably polyethylene terephthalate, which is first draw oriented in the machine direction at temperatures between about 80° to 110° C., preferably in a range of 100° to 105° C. and subsequently draw oriented in the transverse direction by means of a draw tenter at temperature between 70° and 120° C. The film is subsequently heat set at a temperature between 180° to 240° C. The high draw temperature allows a higher machine direction draw ratio which provides a film which can be heat set at the indicated temperature without the film sticking to the tenter clips. The tenter clips are used to maintain tension in the tenter direction. This process gives improved handling characteristics which allows heat stabilizing of the film in the conventional biaxial film process.

In a second process of this invention, referred to as the post stabilization process, the draw temperature of the film in the machine direction is in the range of 79° to 85° C. After stretching in the machine direction, the film is fed into a tentering device for stretching in the transverse direction. After stretching in the transverse direction, the biaxially stretched film is trimmed along the edges where it was held for the transverse direction stretch. The film is then held in a tenter for heat setting at temperatures of over 150° C., preferably about 220° C. This process can be done continuously or sequentially by removing the film, trimming it along the edges and returning it to the line for further heat treating.

Trimming the edges serves the purpose of eliminating amorphous film edges which would subsequently stick in the hot clips and become brittle during the heat setting process.

In both processes contemplated by this invention, the film of this invention is stretched in the machine direction at a draw ratio of 1.0 to 2.0 and then in the transverse direction at a draw ratio of 3.0 to 5.0.

The heat setting step is essential in that it brings a desired high density characteristic to the film. Such high density, which indicates high crystallinity, enhances dimensional stability of the film at elevated temperatures, such as those used during the curing process. The low shrinkage, combined with the absence of development of haze upon heating, provides the required thermal stability and the frangibility in the film makes it acceptable for the uses contemplated by this invention. A birefringence of at least 0.085 results in total internal reflectance and is necessary to prevent the appearance of the optical axis. Similar films with the retardation disclosed herein but with a birefringence below 0.085 are not acceptable because the optical axis is still visible.

The present invention has been described and exemplified with particular reference to polyethylene terephthalate and it is to be understood that the invention comprehends any similar polyester film.

Retardation may be defined in terms of birefringence and film thickness, and to obtain the critical retardation required in the film of this invention, a high birefringence is essential.

Birefringence is a dimensionless number and is a direct measure of the maximum difference of the refractive indices of the film on perpendicular axes. Retardation can be measured directly by use of an optical compensator. When a birefringent film such as oriented polyethylene terephthalate transmits a beam of plane polarized light which strikes perpendicular to the axis of orientation, the light is split into two beams polarized at angles to each other, one of which travels faster than the other. The distance that one of these beams is behind the other when they emerge from the film is referred to as the optical retardation of the sample (expressed in nanometers) and this is related to the film thickness and to birefringence, $\Delta n$, by the equation:

$$\text{Retardation} = \text{thickness} \times \text{birefringence}$$

Thickness is easily measured; retardation can be measured through the use of an optical compensator, and the birefringence can be determined from the above equation.

As used herein, modulus is expressed as pounds per square inch and shrinkage is expressed as a % as measured at 150° C.

The polymeric film used in this invention preferably is 0.7 to 7 mils in thickness.

EXAMPLE 1

Hot Forward Draw Process

Amorphous PET was stretched in the MD (Machine Direction) 2.0 times after preheating to around 100° C. After preheating to 90° C., the film was stretched 3.8 times in the TD (Transverse Direction). The final film thickness was 2.6 mils. This film was heat stabilized in the tenter oven at 220° C. and then cooled to around room temperature (30° C.). Edge trim was taken at the tenter exit. As seen in Table I, the process produced a film which exhibits the necessary characteristics of a glazing film with regard to birefringence. A thicker film could be produced to increase the retardation to the preferred level.

EXAMPLE II

Post Stabilization Proces

Amorphous PET was stretched in the MD 1.5 times after preheating to 85° C. After preheating to 90° C. the film was stretched 3.8 times in the TD. The final film thickness was 5.13 mils. This film was heat stabilized at 150° C. and cooled to around room temperature (30° C.) Edge trim was taken at the tenter exit and the film was wound to a core. This film was subsequently heat stabilized at 182° C. in a tenter oven with edge restraint. The film from this process exhibited the necessary characteristics for a glazing film.

EXAMPLE III

Standard Biax Process

Amorphous PET was stretched in the MD 3.5 times after preheating to around 85° C. After preheating to around 100° C., the film was stretched 3.8 times in the TD. The final film thickness was 4.0 mils. This film was heat stabilized in the tenter oven at about 220° C. and then cooled to room temperature. Edge trim was taken at the tenter exit. Nominal properties for a film by this process are shown in Table I. This film exhibited undesirable color patterns when viewed by partially light and would be unacceptable in a glazing application.

TABLE I

| | Modulus MD/TD KPSI | Tensile Strength MD/TD KPSI | Shrinkage @ 150° C. MD/TD % | Birefringence | Density |
|---|---|---|---|---|---|
| Example I Hot Forward Draw Process | 357/586 | 11.6/31 | .5/3 | .105 | 1.400 |
| Example II Post Stabilization Process | 336/550 | 9.1/39 | .5/.03 | .101 | 1.391 |
| Example III Standard Film Process | 600/600 | 32/32 | 1.3/6 | .03 | 1.395 |

We claim:

1. A process for preparing a biaxially oriented polyester film having a machine direction stretch of 1.0 to 2.0 times its length and a transverse direction stretch of 3.0 to 5.0 times its width, which comprises melt extruding a substantially amorphous polyester film and thereafter orienting the film by stretching it at a draw ratio in the range 1.0 to 2.0 in the machine direction in the plane of the film and then at a draw ratio in the range 3.0 to 5.0 in the transverse direction in the plane of the film and thereafter heat setting the film at a temperature between 180° C. and 240° C.

2. The process as defined in claim 1 wherein the film is heat set while being held in slight tension along its length by tenter clips or similar means.

3. The process as defined in claim 1 wherein the film is stretched in the machine direction with a draw temperature in the range of 80° C. to 110° C. and in the transverse direction at a draw temperature in the range of 70° C. and 120° C.

4. The process as defined in claim 3 wherein the film is stretched in the machine direction with a draw temperature in the range of 100° C. to 105° C.

5. The process as defined in claim 1 wherein the film is stretched in the machine direction with a draw temperature in the range of 80° to 110° C. and in the transverse direction at a draw temperature in the range of 70° to 120° C.

6. The process as defined in claim 5 wherein the film is stretched in the machine direction with a draw temperature in the range of 100° to 105° C.

7. The process as defined in claim 1 which comprises stretching the film in the machine direction at a draw ratio of 2.0 and a temperature of around 100° C.

8. The process as defined in claim 1 which comprises stretching the film in the machine direction at a draw ratio of 1.5 and at a temperature of 85° C.

9. A process for preparing biaxially oriented polymeric film which comprises melt extruding a substantially amorphous polymer film and thereafter orienting the film by stretching it sequentially in two directions, trimming said film along the edges where held for stretching in the transverse direction and subsequently heat setting the film.

10. The process as defined in claim 9 wherein the stretching comprises stretching the film in the machine direction at a draw ratio in the range of 1.0 to 2.0 and then in the transverse direction at a draw ratio in the range of 3.0 to 5.0.

11. The process as defined in claim 10 wherein the draw temperature of the film in the machine direction is in the range of 79° to 85° C.

12. The process as defined in claim 11 wherein the polymeric film is polyester film.

13. The process as defined in claim 12 wherein the heat setting is effected at a temperature over 150° C.

14. The process as defined in claim 13 which comprises stretching the film in the machine direction at a draw ratio of 1.5 and at a temperature of 85° C.

15. The process as defined in claim 11 wherein the heat setting is effected at a temperature over 150° C.

16. A thin, biaxially oriented film which comprises a transparent film structure of a polymeric film which is asymmetrically oriented by stretching 1.0–2.0 times in the machine direction in the plane of the film and 3.0 to 5.0 times in the transverse direction in the plane of the film and which is heat set at a temperature between 180° and 240° C.; said film having a birefringence of at least 0.085, an optical retardation of at least 9000 nanometers, a shrinkage of less than 2% in any direction at 150° C., wherein said film structure is substantially free of color fringes upon viewing in partially polarized light.

17. The film of claim 16 wherein the oriented film is made of polyethylene terephthalate.

18. The film of claim 16 which is prepared by melt extruding a substantially amorphous polyester film and thereafter orienting the film by stretching it sequentially in the machine direction and the transverse direction.

19. The film of claim 18 which is trimmed along the edges where held for stretching in the transverse direction, and subsequently held in a tenter for heat setting.

20. An optically transparent glass laminar structure comprising a film as claimed in claim 16.

21. The structure of claim 20 which is an automotive glazing product.

22. The structure of claim 21 which is a windshield, rear window or sunroof panel.

23. The process as defined in claim 9 wherein the heat setting is effected at a temperature over 150° C.

24. The process as defined in claim 23 wherein the heat setting is effected at a temperature of about 220° C.

* * * * *